(12) United States Patent
Jung et al.

(10) Patent No.: US 8,483,684 B2
(45) Date of Patent: Jul. 9, 2013

(54) METHOD AND APPARATUS FOR PROCESSING CHANGES IN A CSG SUBSCRIPTION IN A WIRELESS COMMUNICATION SYSTEM

(75) Inventors: Sung Hoon Jung, Anyang-si (KR); Sung Duck Chun, Anyang-si (KR); Seung June Yi, Anyang-si (KR); Young Dae Lee, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 72 days.

(21) Appl. No.: 13/201,445

(22) PCT Filed: Mar. 19, 2010

(86) PCT No.: PCT/KR2010/001705
§ 371 (c)(1),
(2), (4) Date: Aug. 12, 2011

(87) PCT Pub. No.: WO2010/107272
PCT Pub. Date: Sep. 23, 2010

(65) Prior Publication Data
US 2012/0015652 A1    Jan. 19, 2012

Related U.S. Application Data

(60) Provisional application No. 61/161,845, filed on Mar. 20, 2009.

(30) Foreign Application Priority Data

Mar. 18, 2010 (KR) .................. 10-2010-0024237

(51) Int. Cl.
*H04W 92/00* (2009.01)

(52) U.S. Cl.
USPC ........................................ 455/435.1; 455/411

(58) Field of Classification Search
USPC ............ 455/411, 426.1, 435.1, 436; 370/310, 370/331
See application file for complete search history.

(56) References Cited

U.S. PATENT DOCUMENTS

2008/0267153 A1   10/2008   Mukherjee et al.
2009/0047960 A1    2/2009   Gunnarsson et al.
2010/0197307 A1*   8/2010   Horn et al. ................. 455/435.1

FOREIGN PATENT DOCUMENTS

| KR | 1020040050413 | 6/2004 |
| KR | 1020080096795 | 11/2008 |
| WO | 2009034076 | 3/2009 |

* cited by examiner

*Primary Examiner* — Sam Bhattacharya
(74) *Attorney, Agent, or Firm* — Lee, Hong, Degerman, Kang & Waimey

(57) ABSTRACT

Provided are a method and an apparatus for processing changes in a closed subscriber group (CSG) subscription in a wireless communication system. A non-access stratum (NAS) of a user equipment receives, from a network, an NAS message indicating that the CSG service to a CSG cell has expired. The NAS notifies the expiration of the CSG service to access stratum (AS), and the AS transmits the expiration of the CSG service to the CSG cell.

9 Claims, 14 Drawing Sheets

METHOD AND APPARATUS FOR PROCESSING CHANGES IN A CSG SUBSCRIPTION IN A WIRELESS COMMUNICATION SYSTEM

CROSS-REFERENCE TO RELATED APPLICATIONS

This application is the National Stage filing under 35 U.S.C. 371 of International Application No. PCT/KR2010/001705, filed on Mar. 19, 2010, which claims the benefit of earlier filing date and right of priority to Korean Application No. 10-2010-0024237, filed on Mar. 18, 2010, and also claims the benefit of U.S. Provisional Application Ser. No. 61/161,845, filed on Mar. 20, 2009.

BACKGROUND OF THE INVENTION

1. Field of the Invention

The present invention relates to wireless communications, and more particularly, to a method and apparatus for processing changes in a closed subcarrier group (CSG) subscription in a wireless communication system.

2. Related Art $3^{rd}$ generation partnership project (3GPP) long term evolution (LTE) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

A closed subscriber group (CSG) is introduced to provide a better quality of service by allowing limited access only to a particular subscriber. A base station capable of providing a CSG service is referred to as a home eNodeB (HNB), and a cell providing a licensed service to subscribers of the CSG is referred to as a CSG cell. Basic requirements of the CSG in 3GPP are disclosed in 3GPP TS 22.220 V1.0.1 (2008-12) "Service requirements for Home NodeBs and Home eNodeBs (Release 9)".

Since the CSG service is provided with a higher price than that of other typical wireless communication services, it is essential to provide a higher-quality service.

There may be changes in a CSG subscription during the CSG service is provided. For example, the CSG service of a user equipment may expire.

Accordingly, there is a need for a method capable of processing changes in a CSG subscription between a user equipment and a network.

SUMMARY OF THE INVENTION

The present invention provides a method and apparatus for processing changes in a closed subcarrier group (CSG) subscription in a wireless communication system.

The present invention also provides a method and apparatus for processing an expiry of a CSG subscription in a wireless communication system.

In an aspect, a method for processing changes in a closed subscriber group (CSG) subscription in a wireless communication system is provided. The method includes receiving by a non-access stratum (NAS) layer from a network a NAS message indicating an expiry of the CSG subscription for a CSG cell, announcing by the NAS layer to an access stratum (AS) layer the expiry of the CSG subscription, and transmitting by the AS layer to the CSG cell the expiry of the CSG subscription.

The NAS message may be received during the CSG service is provided from the CSG cell.

The method may further include reporting by the AS layer to the CSG cell a measurement result on a neighboring cell.

The method may further include after reporting the measurement result, receiving a handover command from the CSG cell.

The method may further include receiving a connection release from the CSG cell after transmitting the expiry of the CSG subscription, and performing cell reselection after receiving the connection release.

The method and may further includes starting a temporary timer when the NAS layer announces the expiry of the CSG subscription to the AS layer, and notifying the connection release by the NAS layer to the AS layer at the expiry of the temporary timer.

In another aspect, a user equipment for processing changes in a closed subscriber group (CSG) subscription in a wireless communication system is provided. The user equipment includes a radio frequency (RF) unit transmitting and receiving a radio signal, and a processor coupled to the RF unit and implementing a radio interface protocol, wherein the processor is configured for receiving by a non-access stratum (NAS) layer from a network a NAS message indicating an expiry of the CSG subscription for a CSG cell, announcing by the NAS layer to an access stratum (AS) layer the expiry of the CSG subscription, and transmitting by the AS layer to the CSG cell the expiry of the CSG subscription.

A user equipment announces changes in a closed subcarrier group (CSG) subscription to a home node B (HNB) when the CSG subscription is changed while receiving a CSG service. Therefore, the HNB can take a proper action according to the changes in the CSG subscription.

DESCRIPTION OF EXEMPLARY EMBODIMENTS

Figure 1:
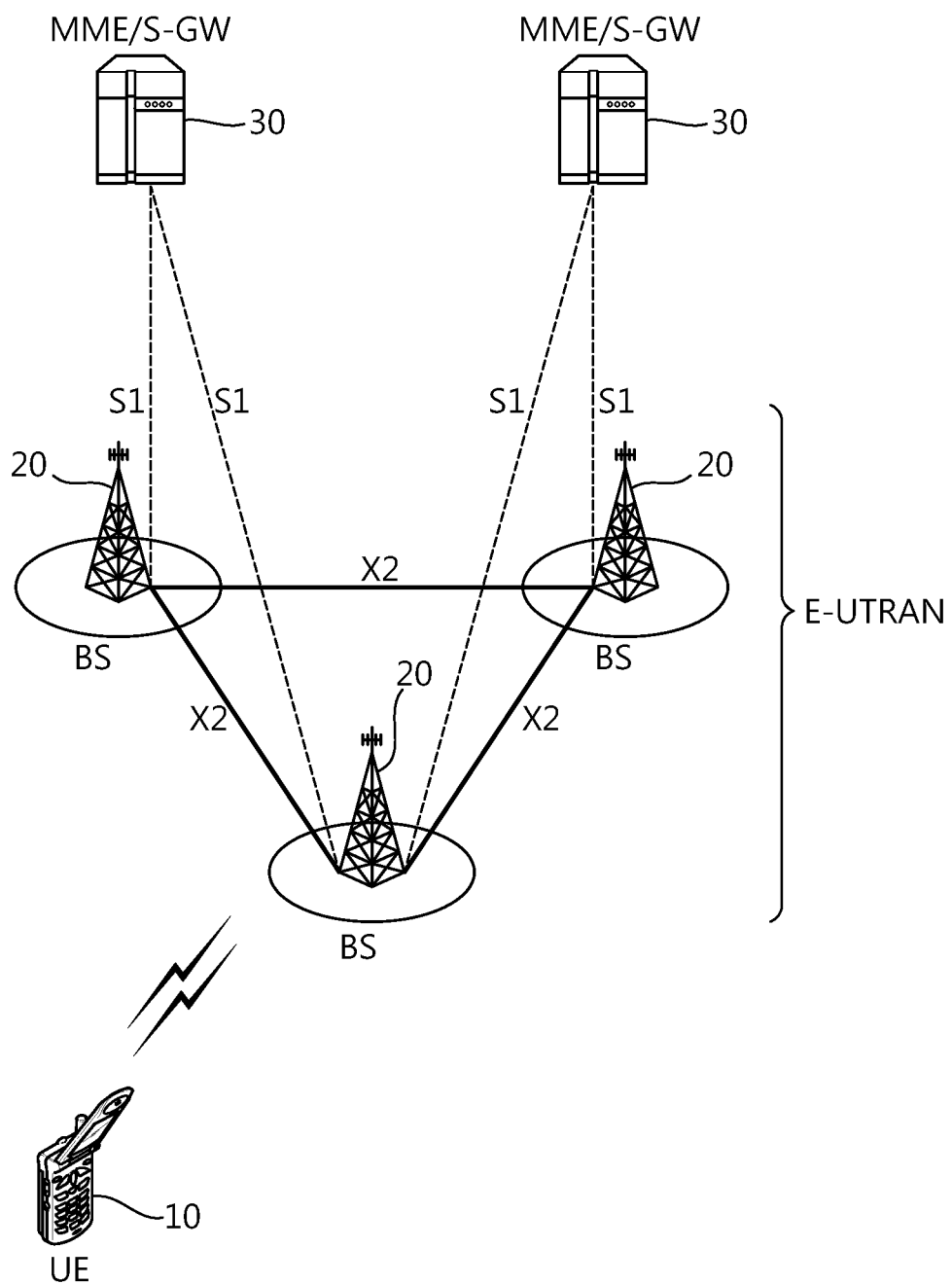
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
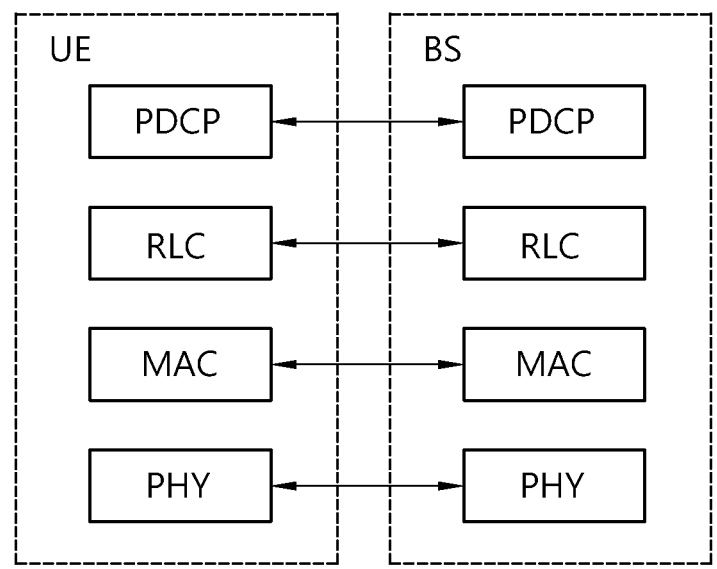
FIG. 2 is a diagram showing a radio protocol architecture for a user plane.
Figure 3:
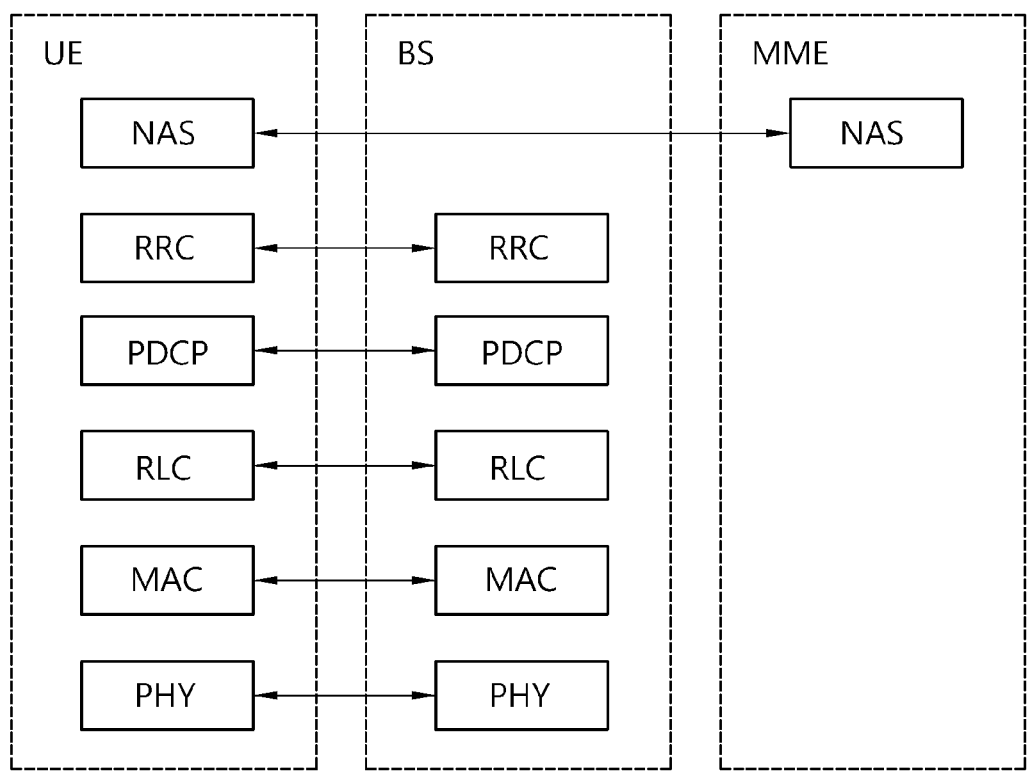
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIG. 2 and FIG. 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

A function of a packet data convergence protocol (PDCP) layer in the user plane includes user data delivery, header compression, and ciphering. A function of a PDCP layer in the control plane includes control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network. The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC_CONNECTED mode, and otherwise the UE is in an RRC_IDLE mode.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

Hereinafter, an RRC state of a UE and an RRC connection mechanism will be described.

The RRC state indicates whether an RRC layer of the UE is logically connected to an RRC layer of an E-UTRAN. If the two layers are connected to each other, it is called an RRC_CONNECTED state, and if the two layers are not connected to each other, it is called an RRC_IDLE state. When in the RRC_CONNECTED state, the UE has an RRC connection and thus the E-UTRAN can recognize a presence of the UE in a cell unit. Accordingly, the UE can be effectively controlled. On the other hand, when in the RRC_IDLE state, the UE cannot be recognized by the E-UTRAN, and is managed by a core network in a tracking area unit which is a unit of a wider area than a cell. That is, regarding the UE in the RRC_IDLE state, only a presence or absence of the UE is recognized in a wide area unit. To receive a typical mobile communication service such as voice or data, a transition to the RRC_CONNECTED state is necessary.

When a user initially powers on the UE, the UE first searches for a proper cell and thereafter stays in the RRC_IDLE state in the cell. Only when there is a need to establish an RRC connection, the UE staying in the RRC_IDLE state establishes the RRC connection with the E-UTRAN through an RRC connection procedure and then transitions to the RRC_CONNECTED state. Examples of a case where the UE in the RRC_IDLE state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successful, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE announces the location of the UE to the network through a tracking area update procedure.

Next, system information will be described.

The system information includes necessary information that must be known to a UE to access a BS. Thus, the UE has to receive all system information before accessing the BS. Further, the UE always has to have the latest system information. Since the system information is information that must be known to all UEs in one cell, the BS periodically transmits the system information.

According to the section 5.2.2 of 3GPP TS 36.331 V8.4.0 (2008-12) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, an SIB includes only information of a neighbor cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network service provider, and a cell can be used only by the network service provider and cannot be used by a normal user.

A service type provided by a cell can be identified as follows.

1) Acceptable cell: A UE can receive a limited service in this cell. This cell is not barred from the perspective of the UE, and satisfies a cell selection criterion of the UE.

2) Suitable cell: The UE can receive a regular service in this cell. This cell satisfies a condition of an acceptable cell, and also satisfies additional conditions. Regarding the additional conditions, this cell has to belong to a PLMN to which the UE can access, and a tracking area update procedure of the UE must not be barred in this cell. If a specific cell is a CSG cell, this cell must be accessible by the UE as a CSG member.

3) Barred cell: Information indicating that a cell is a barred cell is broadcast in this cell by using system information.

4) Reserved cell: Information indicating that a cell is a reserved cell is broadcast in this cell by using system information.

Hereinafter, a closed subscriber group (CSG) will be described.

A BS which provides a CSG service is called a home node B (HNB) or home eNB (HeNB) in 3GPP. Hereinafter, both the HNB and HeNB are collectively referred to as the HNB. The HNB is basically used to provide specialized services only to members of the CSG. However, according to operation mode setting of the HNB, the services may also be provided to other users in addition to the users of the CSG.

Figure 4:
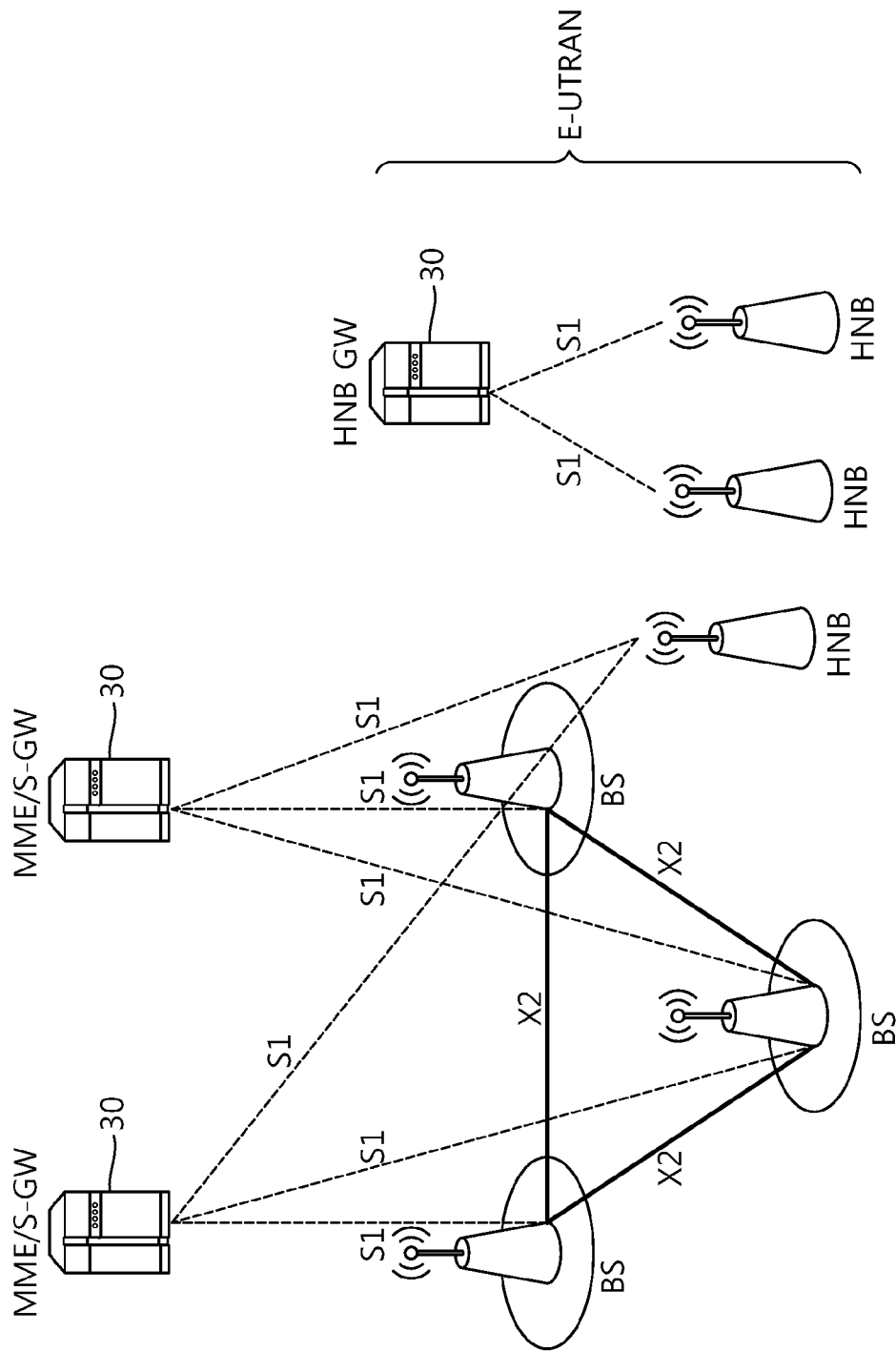
FIG. 4 is an exemplary view showing a network architecture for managing a home node B (HNB) by using an HNB gateway (GW).

FIG. 4 is an exemplary view showing a network architecture for managing an HNB by using an HNB gateway (GW).

HNBs are connected to an EPC directly or via the HNB GW. Herein, an MME regards the HNB GW as a typical BS. Further, the HNB regards the HNB GW as the MME. Therefore, the HNB and the HNB GW are connected by means of an S1 interface, and also the HNB GW and the EPC are connected by means of the S1 interface. Furthermore, even in a case where the HNB and the EPC are directly connected, they are connected by means of the S1 interface. A function of the HNB is almost similar to a function of the typical BS.

In general, the HNB has radio transmission output power lower than that of a BS owned by a mobile communication service provider. Therefore, in general, the coverage provided by the HNB is smaller than the coverage provided by the BS. Due to such characteristics, a cell provided by the HNB is often classified as a femto cell in contrast to a macro cell provided by the BS from the perspective of the coverage.

From the perspective of provided services, when the HNB provides the services only to the CSG group, a cell provided by this HNB is referred to as a CSG cell.

Each CSG has its own identity which is called a CSG identity (CSG ID). The UE may have a list of CSGs to which the UE belongs as a member thereof, and this CSG list may change by a request of the UE or by a command of the network. In the current specification of the 3GPP, one HNB can support one CSG.

The UE has the list of CSGs to which the UE belongs as a member thereof. This list is called as a CSG white list.

The HNB delivers the CSG ID of the CSG supported by the HNB itself by using system information, so as to allow access of only a member UE of the corresponding CSG. When the CSG cell is found, the UE may read the CSG ID included in the system information to determine which CSG is supported by the CSG cell. The UE that has read the CSG ID regards the corresponding cell as an accessible cell only if the UE itself is a member of the corresponding CSG cell, that is, if the CSG corresponding to the CSG ID is included in the CSG white list of the UE.

It is not always required for the HNB to allow access of the CSG UE. Based on the configuration setting of the HNB, access of a non-CSG member UE may also be allowed. According to the configuration setting of the HNB, access is allowed for a different UE. Herein, the configuration setting denotes setting of an operation mode of the HNB. The operation mode of the HNB is classified into three modes described below, depending on a type of UE for which a service is provided.

1) Closed access mode: A mode in which services are provided to particular CSG members only. The HNB provides a CSG cell.

2) Open access mode: A mode in which services are provided without any restriction of particular CSG members, similarly to the typical BS. The HNB provides a typical cell instead of a CSG cell. For convenience of explanation, the macro cell is defined in general as a cell which operates in the open access mode.

3) Hybrid mode: A mode in which CSG services are provided to particular CSG members and also services are provided to non-CSG members, similarly to a typical cell. It is recognized as a CSG cell for the CSG member UE, and recognized as a typical cell for the non-CSG member UE. This cell is called a hybrid cell.

The HNB notifies the UE whether a cell serviced by the HNB is a CSG cell or a typical cell, and thus allows the UE to know whether the UE can access to the cell. When operating in the closed access mode, the HNB broadcasts that the cell serviced by the HNB is the CSG cell by using system information. When operating in the open access mode, the HNB broadcasts that the cell serviced by the HNB is not the CSG cell by using the system information. In this manner, the HNB inserts a CSG indicator into the system information, wherein the CSG indicator indicates whether the cell being serviced by the HNB is the CSG cell or not.

For example, the CSG cell broadcasts the CSG indicator by setting it to 'TRUE'. If the cell being serviced is not the CSG cell, a method of setting the CSG indicator to 'FALSE' or omitting transmission of the CSG indicator may be used. Since the UE has to distinguish the CSG cell from the typical cell, the typical BS may also transmit the CSG indicator (for example, the CSG indicator set to 'FALSE') so as to allow the UE to know that the cell type provided by the BS is the typical cell. Furthermore, the typical BS may allow the UE to know that the cell type provided by the BS is the typical cell by not transmitting the CSG indicator.

The CSG-related parameters transmitted by the corresponding cell for each cell type are represented in Table 1. The CSG-related parameters may be transmitted by using the system information.

TABLE 1

|  | CSG Cell | Typical Cell |
| --- | --- | --- |
| CSG Indicator | 'CSG Cell' is indicated | 'Non-CSG cell' is indicated, or not transmitted |
| CSG ID | Supported CSG ID is transmitted | Not transmitted |

A type of UE for which access is accepted is represented in Table 2.

TABLE 2

|  | CSG Cell | Typical Cell |
| --- | --- | --- |
| UE not supporting CSG | Access denied | Access accepted |
| Non-CSG member UE | Access denied | Access accepted |
| CSG member UE | Access accepted | Access accepted |

Figure 5:
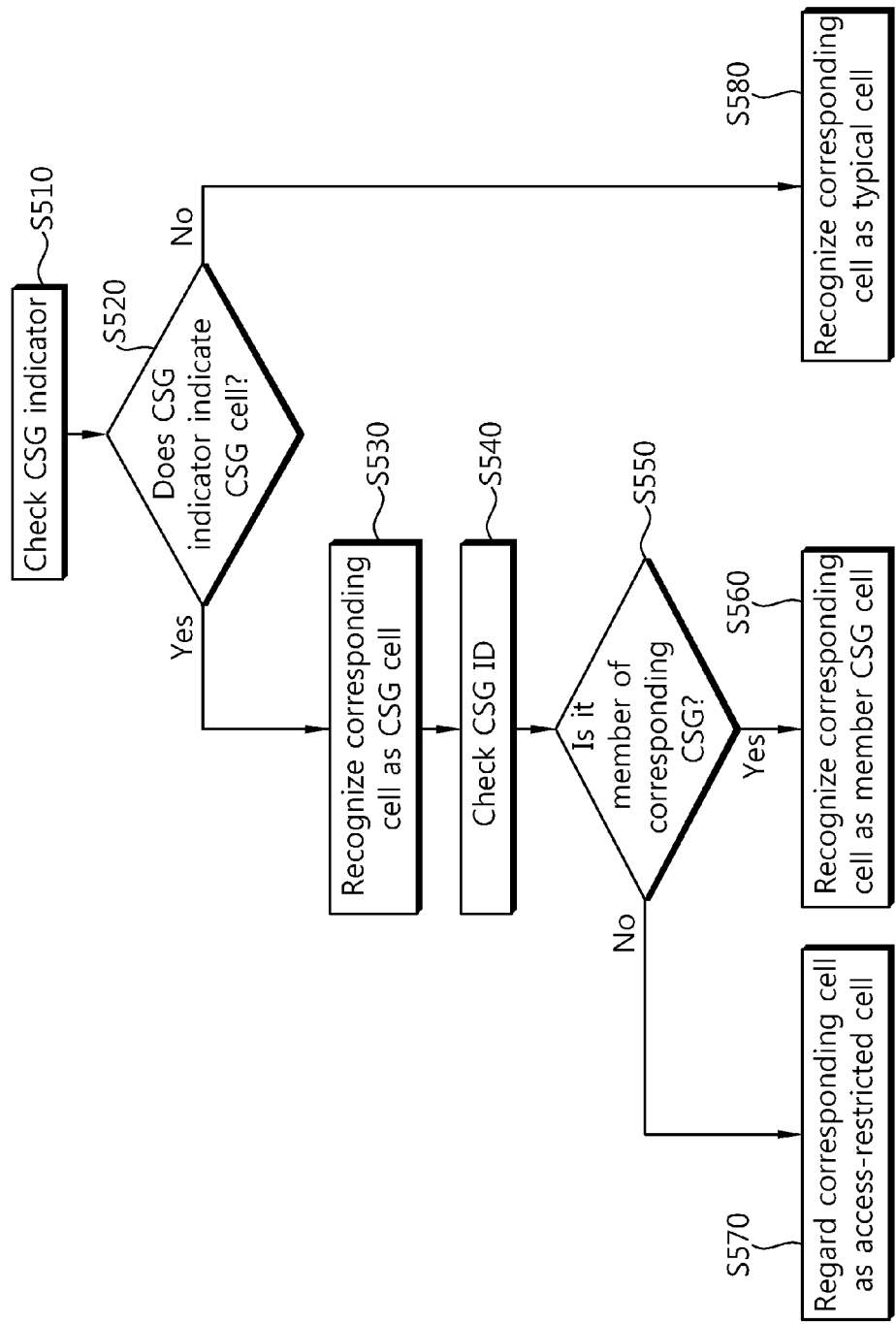
FIG. 5 is a flowchart showing a method of checking for an access mode of a base station by a user equipment.

FIG. 5 is a flowchart showing a method of checking for an access mode of a BS by a UE.

The UE checks for a CSG indicator existing in system information of a target cell in order to determine a type of the target cell (step S510).

After checking for the CSG indicator, if the CSG indicator indicates that the target cell is a CSG cell, the UE recognizes the cell as the CSG cell (steps S520 and S530). Thereafter, the UE checks for a CSG ID existing in the system information in order to determine whether the UE itself is a CSG member of the target cell (step S540).

If the UE determines that the UE is the CSG member of its target cell by using the CSG ID, the cell is recognized as an accessible CSG cell (steps S550 and S560). If the UE determines that the UE is not the CSG member of its target cell by using the CSG ID, the cell is recognized as an access-restricted CSG cell (steps S550 and S570).

If the CSG indicator indicates that the target cell is not the CSG, the UE recognizes the target cell as a typical cell (steps S520 and S580). Furthermore, if the CSG indicator is not transmitted in the step S510, the UE recognizes the target cell as the typical cell.

In general, CSG cells and macro cells may be concurrently managed at a particular frequency. A CSG dedicated frequency is a frequency at which only the CSG cells exist. A mixed carrier frequency is a frequency at which both the CSG cells and the macro cells exist. The network may reserve a physical layer cell identity for the CSG cell at the mixed carrier frequency. The physical layer cell identity is called a physical cell identity (PCI) in E-UTRAN and is called a physical scrambling code (PSC) in UTRAN. For clarity, the physical layer cell identity will be expressed by the PCI.

The CSG cell notifies information on the PCI reserved for the CSG cell at a current frequency by using the system information. The UE that has received this information can determine whether or not this cell is a CSG cell from the PCI of the cell when a certain cell is found at the corresponding frequency. The information is utilized by the UE as described below, which will be explained by taking two types of UEs for example.

First, if a UE does not support the CSG-related function nor has no CSG list to which the UE itself belongs, the UE does not need to regard a CSG cell as a selectable cell during a cell selection/reselection process. In this case, the UE checks for only the PCI of the cell, and may immediately excludes the corresponding cell in the cell selection/reselection process if the PCI is a reserved PCI for the CSG. In general, the PCI of a certain cell can be immediately known during a process of checking for the existence of the corresponding cell in a physical layer by the UE.

Second, in case of a UE having a CSG list to which the UE itself belongs, when the UE wants to know a list of neighboring CSG cells at a mixed carrier frequency, it may be known that the corresponding cell is a CSG cell if only a cell having the PCI reserved for CSG is found, instead of individually checking for the CSG ID of the system information for every cell found in the whole PCI range.

Figure 6:
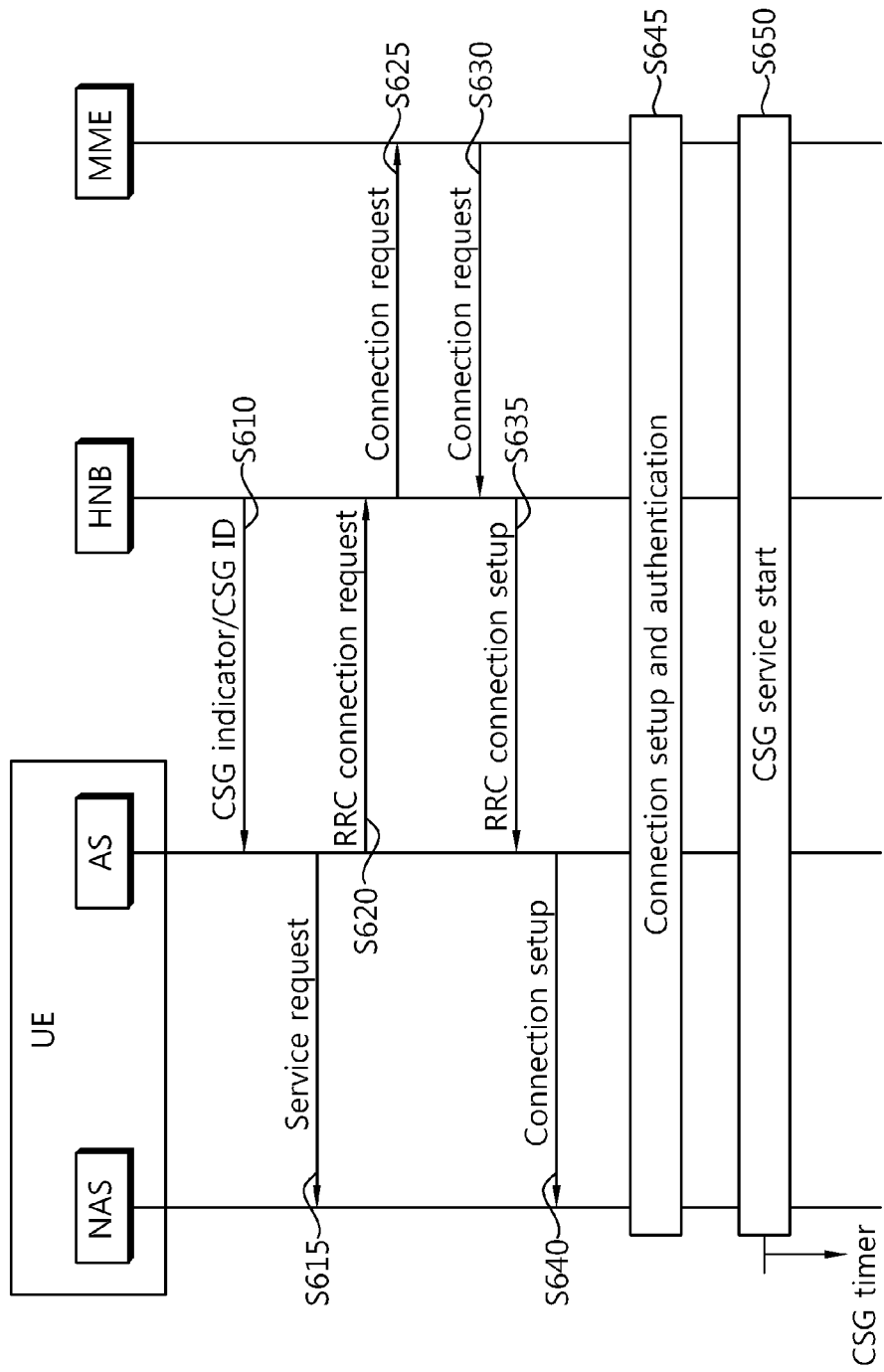
FIG. 6 is a flowchart showing an example of setting up a closed subcarrier group (CSG) service.

FIG. 6 is a flowchart showing an example of setting up a CSG service. A UE implements a NAS layer and an access stratum (AS) layer. The AS layer is a layer equal to or lower than a third layer of a radio interface protocol.

The UE receives a CSG indicator and a CSG ID from an HNB (step S610). A NAS of the UE determines whether it is a member subscribed to a CSG cell of the HNB upon receiving a service request (step S615). Herein, it is assumed that the UE is a CSG member UE of the HNB.

An RRC of the UE sends an RRC connection request to the HNB (step S620). The HNB sends a connection request to an MME (step S625), and receives a connection grant from the MME (step S630). In response thereto, the HNB sends an RRC connection setup message to the UE (step S635). The RRC of the UE sends a connection setup to the NAS (step S640). Thereafter, a CSG service negotiation and authentication procedure is performed (step S645).

The CSG service starts (step S650). A CSG timer may start upon starting of the CSG service. The CSG service can be provided from the CSG cell during the CSG timer is running. The expiry of the CSG timer implies the end of the CSG service. The CSG timer can operate in the NAS and/or the AS.

Now, problems occurring in the CSG management will be described.

As shown in FIG. 3 and FIG. 6, an MME communicates with a UE by using a NAS protocol. A BS forwards a NAS message received from the MME to the UE but does not decode the message. Therefore, the NAS message is transparent to the BS.

A CSG whitelist of the UE is managed by the MME. Deleting, changing, and adding of the CSG included in the CSG whitelist preserved in the UE can be indicated by the MME. For example, the MME can instruct the UE to add the CSG or to delete the CSG.

Figure 7:
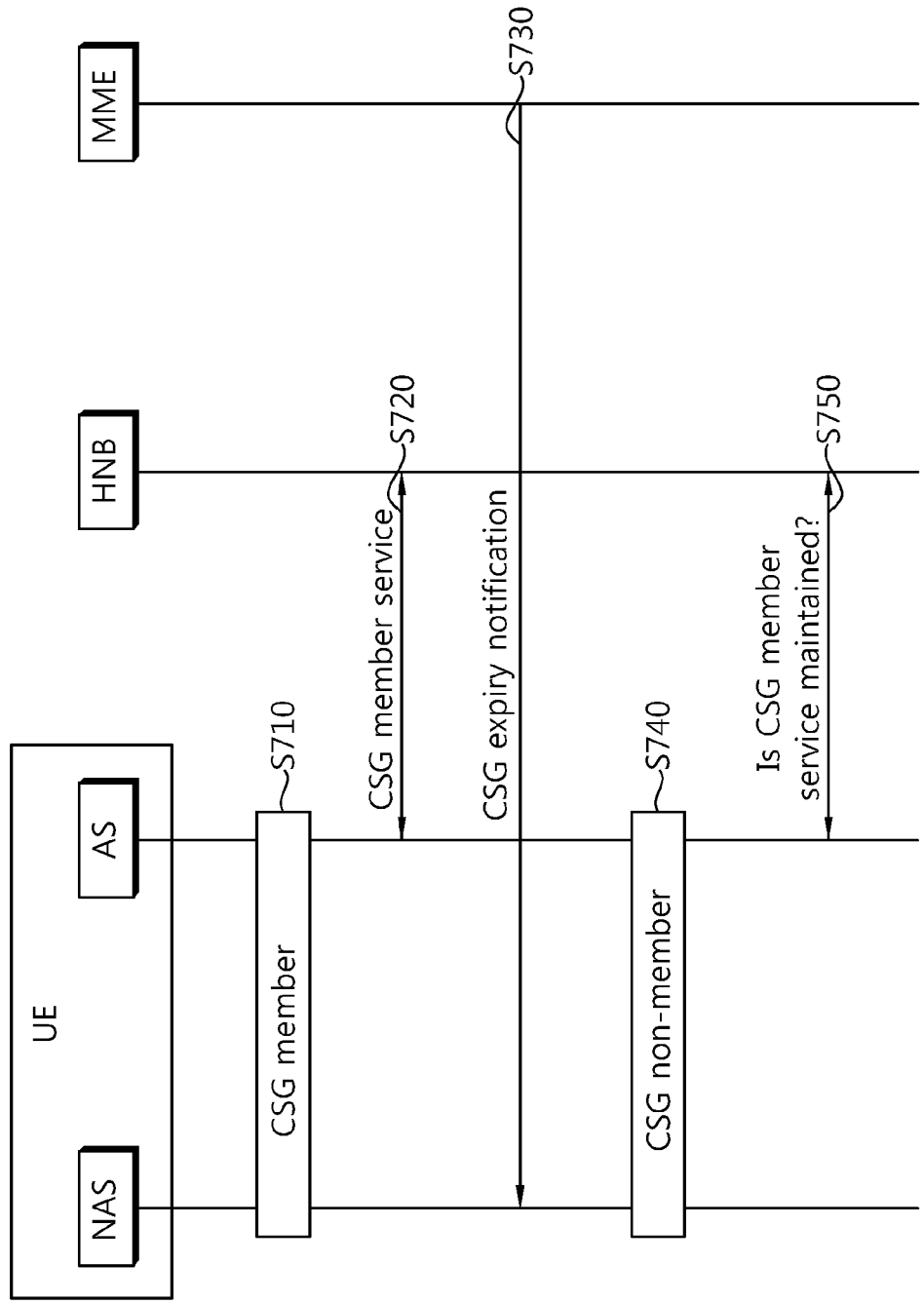
FIG. 7 is a flowchart showing a problem caused by a CSG expiry.

FIG. 7 is a flowchart showing a problem caused by a CSG expiry.

As a CSG member, a UE is included in a whitelist of the UE supported by an HNB (step S710). Therefore, the UE receives a CSG member service from the HNB (step S720).

An MME notifies a CSG expiry of the CSG service corresponding to a NAS of the UE by using a NAS message (step S730). Therefore, the UE becomes a CSG non-member of the HNB (step S740).

However, since the HNB does not know whether the UE is the CSG non-member unless it is announced by the UE or the MME, the UE can continuously maintain the CSG member service (step S750).

When the MME instructs changes in the CSG whitelist of the UE, the MME communicates with the UE by using a NAS protocol. Therefore, whether the CSG whitelist is changed cannot be known until the MME directly announces it to the HNB.

If a CSG subscription expiry of a current CSG cell is notified from the MME while the UE receives a service from the CSG cell as the CSG member, the UE is no longer the CSG member. However, if the MME does not notify the CSG subscription expiry directly to the CSG cell even if the UE is not the CSG member, the CSG cell cannot take any action for the UE. That is, there is a problem in that a CSG non-member UE continuously receives the CSG member service from the CSG cell.

According to the proposed scheme, if there are changes in a CSG subscription while receiving the CSG service, the UE can optionally announce the CSG subscription expiry to the HNB. If the UE is no longer the CSG member of the CSG cell currently being accessed, cell reselection to another cell can be performed.

The changing of the CSG subscription of the UE may imply the expiry of the CSG subscription, expiry scheduling of the CSG subscription, and/or adding of the CSG subscription of the UE.

Upon receiving changes in the CSG subscription, the BS may instruct the UE to move to another cell or may regulate quality of service (QoS) of the UE.

When the UE announces the changing of the CSG subscription to the BS, it may be reported by including a measurement result for a neighboring cell. When the CSG subscription expiry is imminent, the UE can actively perform measurement on neighboring cells in order to report the measurement result. Upon receiving the measurement result, the BS can deliver a command for moving to another cell to the UE on the basis of the measurement result.

When the UE moves to a different cell upon changing of the CSG subscription, the UE can perform a cell selection or cell reselection procedure. The UE can actively or passively perform the cell selection or cell reselection procedure. In the cell selection/reselection procedure, the UE can consider a previously accessed CSG cell as a non-accessibly cell.

The moving to the different cell can start upon receiving a command for moving to the different cell or a different frequency from the BS to the UE (e.g., an RRC connection release or a handover command).

A message for delivering the command for instructing the UE to move to the different cell or the different frequency by the BS may include an instruction for excluding a previously accessed CSG cell in the cell selection/reselection procedure. For example, a release cause field included in an RRC connection release message indicates the CSG expiry.

Figure 8:
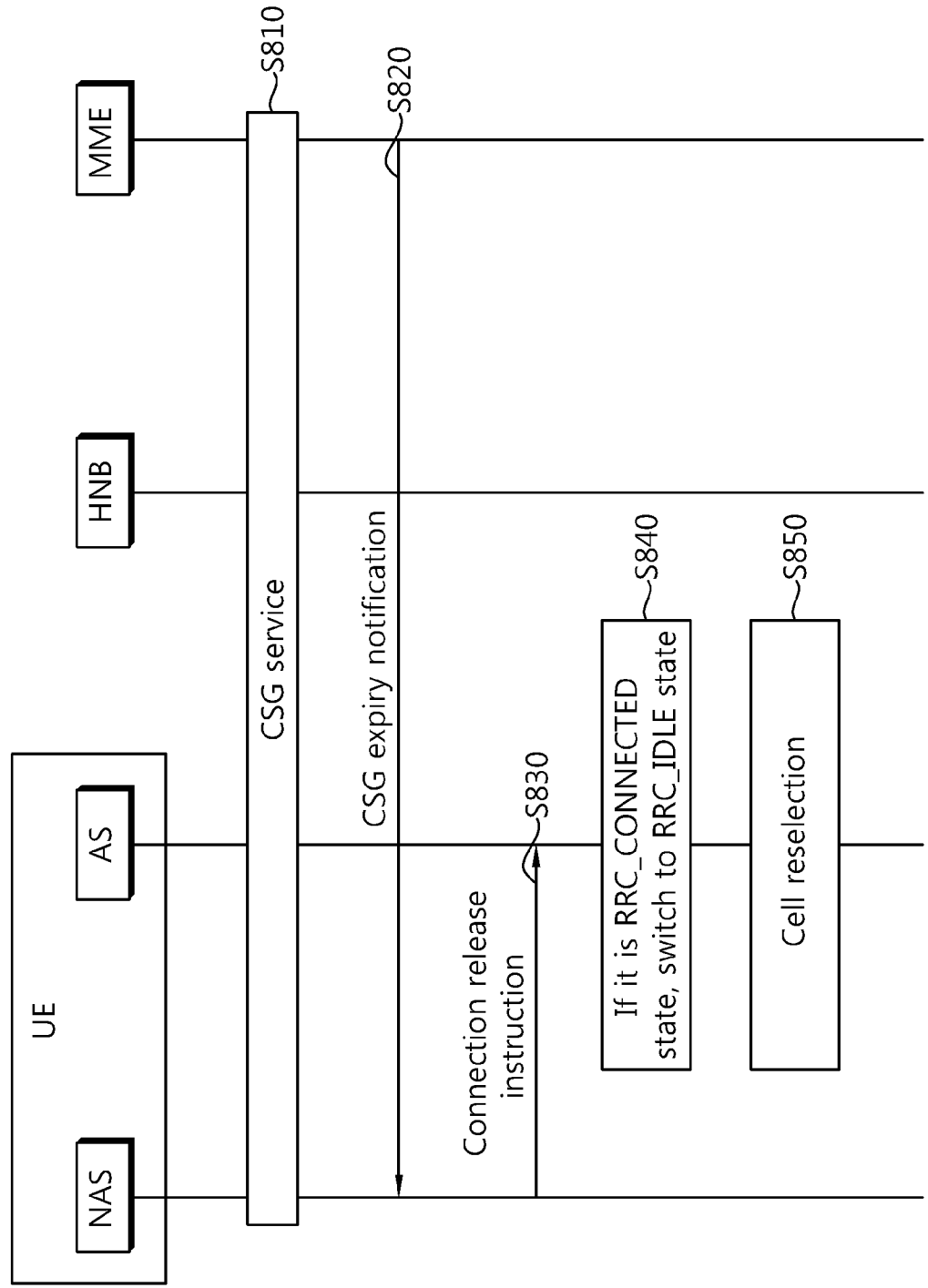
FIG. 8 is a flowchart showing a method of supporting a CSG service according to an embodiment of the present invention.

FIG. 8 is a flowchart showing a method of supporting a CSG service according to an embodiment of the present invention.

A UE and an HNB are providing the CSG service (step S810). An MME notifies a CSG expiry to a NAS of the UE (step S820). In order to notify a CSG service subscription expiry of a CSG cell to which the UE accesses as a CSG member, the MME sends a NAS message indicating the CSG expiry to the HNB, and the HNB directly forwards to the UE the NAS message received from the MME. Since the BS does not decode the received NAS message, the BS does not know that the NAS message indicates the CSG expiry. Therefore, the HNB does not know that fact that the UE is no longer the CSG member.

Upon receiving the NAS message transmitted from the MME, the NAS of the UE confirms the expiry of the CSG subscription for the CSG cell of the currently accessed HNB. The NAS of the UE instructs an RRC of the UE to release an RRC connection with a current cell by considering the CSG subscription expiry as a release cause (step S830).

When the RRC connection release is instructed, the UE in an RRC_CONNECTED state switches to an RRC_IDLE state (step S840).

In the RRC_IDLE state, the UE performs a cell reselection procedure (step S850). In this case, the previously accessed CSG cell can be excluded from a candidate cell to be reselected.

By allowing the UE to actively reselect a cell upon notifying the CSG subscription expiry, additional signaling with the HNB is not required. The HNB can provide the CSG service to another CSG member UE in a more reliable manner.

Figure 9:
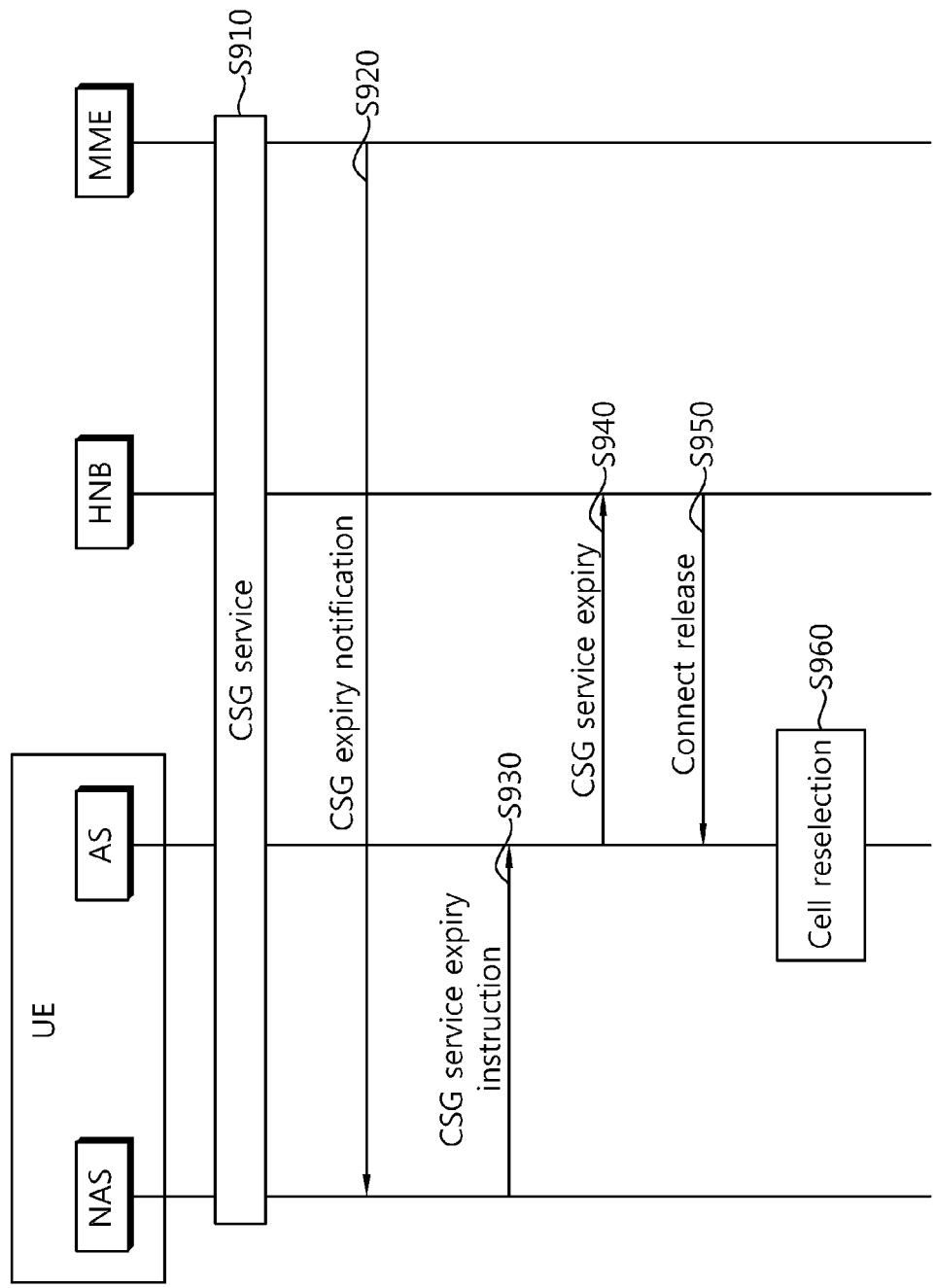
FIG. 9 is a flowchart showing a method of supporting a CSG service according to another embodiment of the present invention.

FIG. 9 is a flowchart showing a method of supporting a CSG service according to another embodiment of the present invention.

A UE and an HNB are providing the CSG service (step S910). An MME notifies a CSG expiry to a NAS of the UE (step S920).

Upon receiving a NAS message transmitted from the MME, the NAS of the UE confirms the expiry of the CSG subscription for the CSG cell of the currently accessed HNB. The NAS of the UE instructs the CSG subscription expiry to an RRC (step S930).

An AS of the UE announces the CSG expiry to the HNB (step S940). The UE can announce the CSG expiry to the HNB by using an RRC message, a MAC message, or a physical layer message.

Upon receiving the CSG subscription expiry from the UE, the HNB announces to the UE an RRC connection release by considering the CSG expiry as a release cause (step S950).

In the RRC_IDLE state, the UE performs a cell reselection procedure (step S960). In this case, the previously accessed CSG cell can be excluded from a candidate cell to be reselected. That is, the UE reselects another cell other than the previous CSG cell.

When the HNB operates in a hybrid mode, the HNB can provide a service to a CSG non-member UE. Therefore, the HNB operating in the hybrid mode may provide the service as the CSG non-member UE instead of sending the connection release even if the CSG expiry is notified from the UE.

By allowing the UE to perform announcement to the HNB in the CSG subscription state, the HNB can provide the CSG service to the CSG member UE in a more reliable manner.

Figure 10:
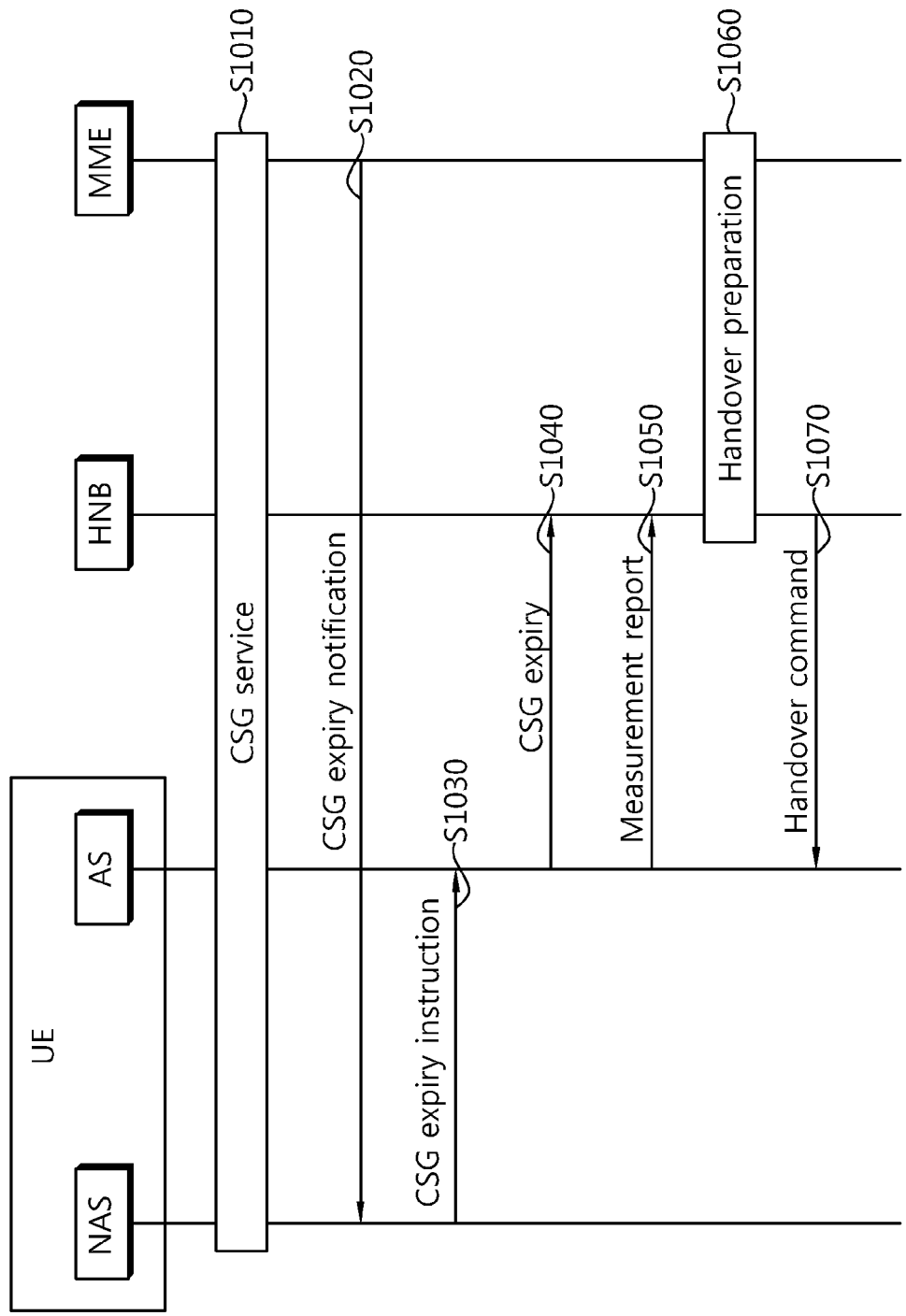
FIG. 10 is a flowchart showing a method of supporting a CSG service according to another embodiment of the present invention.

FIG. 10 is a flowchart showing a method of supporting a CSG service according to another embodiment of the present invention.

A UE and an HNB are providing the CSG service (step S1010). An MME notifies a CSG expiry to a NAS of the UE (step S1020).

Upon receiving a NAS message transmitted from the MME, the NAS of the UE confirms the expiry of the CSG subscription for the CSG cell of the currently accessed HNB. The NAS of the UE instructs the CSG subscription expiry to an RRC (step S1030).

An AS of the UE announces the CSG expiry to the HNB (step S1040). The UE can announce the CSG expiry to the HNB by using an RRC message, a MAC message, or a physical layer message.

The RRC of the UE reports a measurement result of a neighboring cell to the HNB (step S1050). The AS of the UE can start to measure a signal of the neighboring cell upon receiving an instruction of a CSG expiry from the NAS.

Although it is shown herein that the CSG expiry and the measurement report are separately achieved, the measurement report message including the measurement result may include a field for indicating the CSG expiry. That is, the measurement report and the CSG expiry can be delivered to the HNB as one message.

Upon receiving the CSG expiry and the measurement result, the HNB prepares a handover (step S1060).

The HNB sends a handover command to the UE so that the UE is handed over to another cell (step S1070).

When the HNB operates in a hybrid mode, the HNB can provide a service to a CSG non-member UE. Therefore, the HNB operating in the hybrid mode may provide the service as the CSG non-member UE instead of sending the handover command even if the CSG expiry is notified from the UE.

Figure 11:
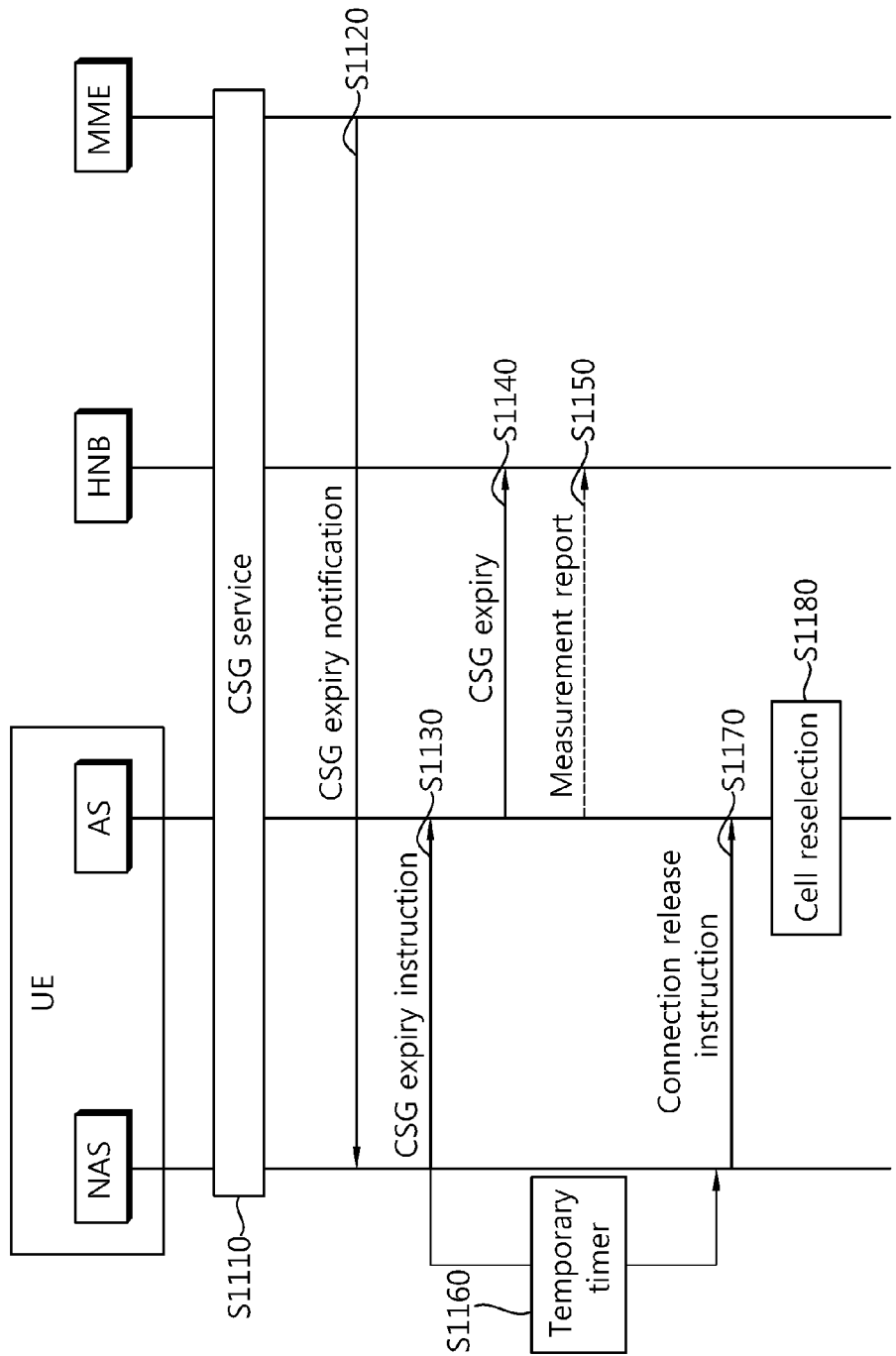
FIG. 11 is a flowchart showing a method of supporting a CSG service according to another embodiment of the present invention.

FIG. 11 is a flowchart showing a method of supporting a CSG service according to another embodiment of the present invention.

A UE and an HNB are providing the CSG service (step S1110). An MME notifies a CSG expiry to a NAS of the UE (step S1120).

Upon receiving a NAS message transmitted from the MME, the NAS of the UE confirms the expiry of the CSG subscription for the CSG cell of the currently accessed HNB. The NAS of the UE instructs the CSG subscription expiry to an RRC (step S1130).

An AS of the UE announces the CSG expiry to the HNB (step S1140). The UE can send the measurement report to the HNB at the same time of the CSG expiry or separately from the CSG expiry (step S1150).

The NAS of the UE starts a temporary timer while instructing the CSG subscription expiry to the RRC (step S1160). Upon receiving an RRC connection release or a handover command from the HNB during the temporary timer is running, the temporary timer can stop and a cell reselection or handover can be performed.

At the expiry of the temporary timer, the NAS of the UE instructs the RRC of the UE to release an RRC connection with a current cell by considering the CSG subscription expiry as a release cause (step S1170).

In an RRC_IDLE state, the UE performs a cell reselection procedure (step S1180). In this case, the previously accessed CSG cell can be excluded from a candidate cell to be reselected.

When the CSG subscription expiry is notified, the UE starts the temporary timer. The UE waits to receive an instruction from the HNB during the temporary timer is running. If no instruction is received until the temporary timer expires, cell reselection is performed autonomously.

Figure 12:
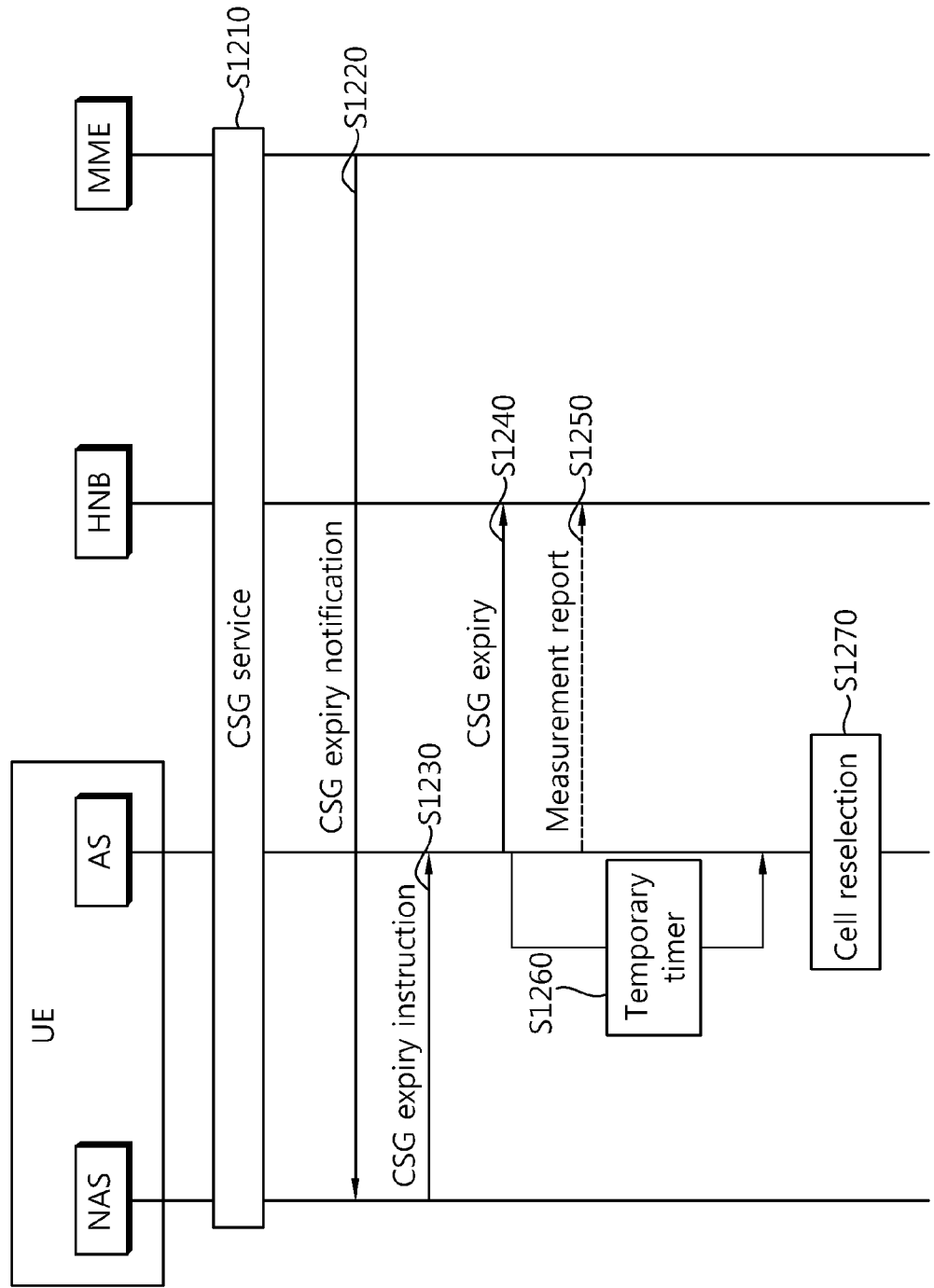
FIG. 12 is a flowchart showing a method of supporting a CSG service according to another embodiment of the present invention.

FIG. 12 is a flowchart showing a method of supporting a CSG service according to another embodiment of the present invention.

A UE and an HNB are providing the CSG service (step S1210). An MME notifies a CSG expiry to a NAS of the UE (step S1220).

Upon receiving a NAS message transmitted from the MME, the NAS of the UE confirms the expiry of the CSG subscription for the CSG cell of the currently accessed HNB. The NAS of the UE instructs the CSG subscription expiry to an RRC (step S1230).

An AS of the UE announces the CSG expiry to the HNB (step S1240). The UE can send the measurement report to the HNB at the same time of the CSG expiry or separately from the CSG expiry (step S1250).

The AS of the UE starts a temporary timer while announcing the CSG subscription expiry to the HNB (step S1260). Upon receiving an RRC connection release or a handover command from the HNB during the temporary timer is running, the temporary timer can stop and a cell reselection or handover can be performed.

At the expiry of the temporary timer, the UE performs a cell reselection procedure in an RRC_IDLE state (step S1270). In this case, the previously accessed CSG cell can be excluded from a candidate cell to be reselected.

Figure 13:
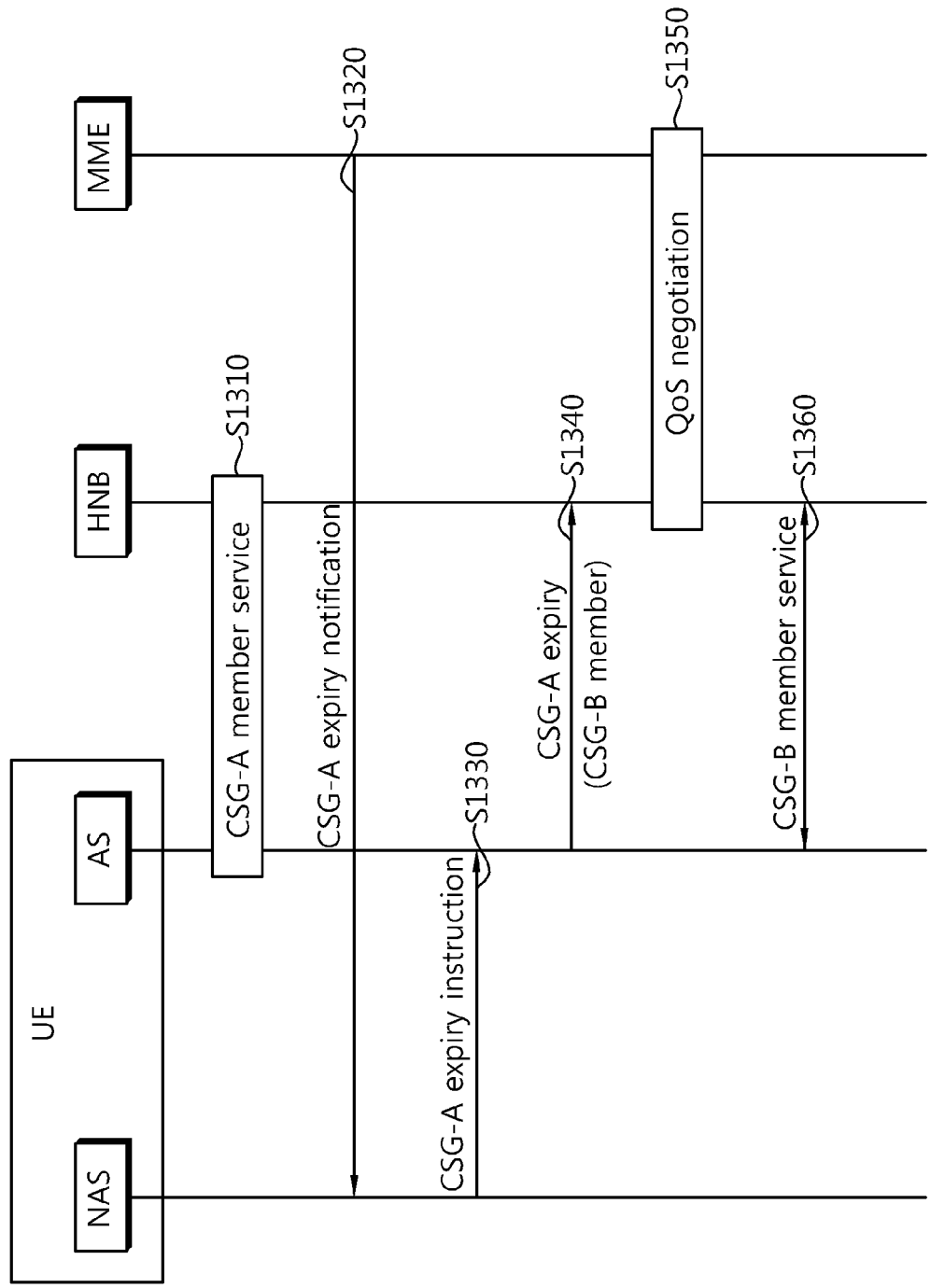
FIG. 13 is a flowchart showing a method of supporting a CSG service according to another embodiment of the present invention.

FIG. 13 is a flowchart showing a method of supporting a CSG service according to another embodiment of the present invention. In this case, an HNB provides a plurality of CSG cells. It is assumed herein that the HNB supports a CSG-A and a CSG-B, and a CSG whitelist of a UE also includes the CSG-A and the CSG-B.

The UE and the HNB are providing a CSG service as CSG-A members (step S1310). An MME notifies a CSG-A service expiry to a NAS of the UE (step S1320). That is, the MME requests the UE to delete the CSG-A from the CSG whitelist.

Upon receiving a NAS message transmitted from the MME, the NAS of the UE confirms the expiry of the CSG subscription for the CSG-A of the currently accessed HNB. The NAS of the UE instructs the CSG-A subscription expiry to an RRC (step S1330).

An AS of the UE announces the CSG-A expiry to the HNB (step S1340). In this case, the UE can announce to the HNB that the UE is a member of the CSG-B. That is, the UE announces the CSG-A subscription expiry, and thereafter announces to the HNB that it is receiving a CSG service as the member of the CSG-B.

Since the UE is still the member of the CSG-B in which the HNB can receive the CSG service, the HNB negotiates with the MME about QoS of the CSG-B service instead of instructing a procedure for moving the UE to another cell (step S1350).

The HNB, as the member of the CSG-B, provides the CSG service to the UE (step S1360).

The UE announces changes in the CSG subscription to the HNB when the CSG subscription is changed while receiving the CSG service. Therefore, the HNB can take a proper action according to the changes in the CSG subscription.

Although it is described in the aforementioned embodiments that the CSG expiry is notified from the MME through the NAS message, the CSG expiry may start at the expiry of the CSG timer.

Figure 14:
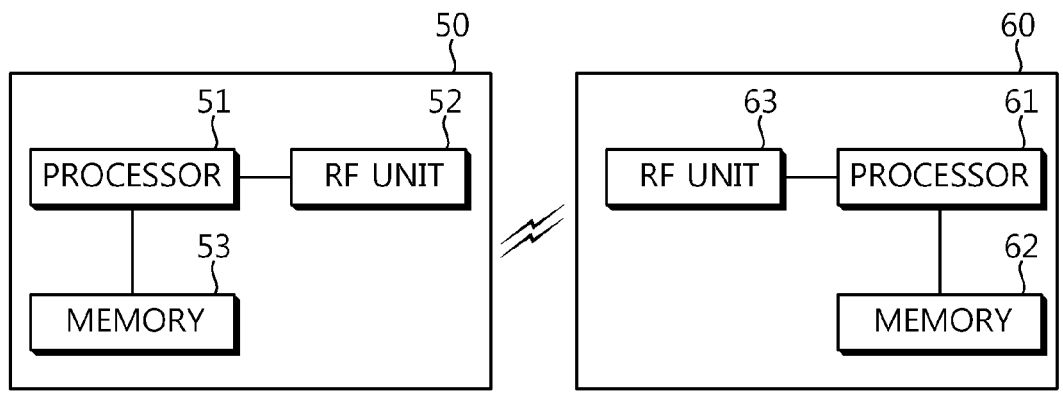
FIG. 14 is a block diagram showing a wireless communication system according to an embodiment of the present invention.

FIG. 14 is a block diagram showing a wireless communication system according to an embodiment of the present invention. A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal.

The processor 51 implements the proposed functions, processes, and/or methods. Layers of a radio interface protocol can be implemented by the processor 51. The processor 51 can send CSG related information, and can instruct a UE 60 to take a proper action upon receiving changes in a CSG subscription.

The UE 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal.

The processor 61 implements the proposed functions, processes, and/or methods. Layers of a radio interface protocol can be implemented by the processor 61. The processor 61 implements a NAS layer and an AS layer, and processes changes in a CSG subscription.

The processors 51, 61 may include application-specific integrated circuit (ASIC), other chipset, logic circuit and/or data processing device. The memories 52, 62 may include read-only memory (ROM), random access memory (RAM), flash memory, memory card, storage medium and/or other storage device. The RF units 53, 63 may include baseband circuitry to process radio frequency signals. When the embodiments are implemented in software, the techniques described herein can be implemented with modules (e.g., procedures, functions, and so on) that perform the functions described herein. The modules can be stored in memories 52, 62 and executed by processors 51, 61. The memories 52, 62 can be implemented within the processors 51, 61 or external to the processors 51, 61 in which case those can be communicatively coupled to the processors 51, 61 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for processing changes in a closed subscriber group (CSG) subscription in a wireless communication system, the method comprising:

receiving, by a non-access stratum (NAS) layer of a mobile terminal, an NAS message from a network,
wherein the NAS message indicates an expiration of the CSG subscription for a CSG cell,
wherein the NAS message is received during a CSG service provided from the CSG cell;
announcing, by the NAS layer of the mobile terminal, the expiration of the CSG subscription to an access stratum (AS) layer of the mobile terminal;
transmitting by the AS layer of the mobile terminal, the expiration of the CSG subscription to the CSG cell;
receiving, by the NAS layer of the mobile terminal, a radio resource control (RRC) connection release message from the CSG cell after transmitting the expiration of the CSG subscription, wherein the RRC connection release message includes a release cause field indicating the expiration of the CSG subscription; and performing, by the AS layer of the mobile terminal, a cell reselection after receiving the RRC connection release message.

2. The method of claim 1, further comprising reporting, by the AS layer of the mobile terminal to the CSG cell, a measurement result on a neighboring cell.

3. The method of claim 2, further comprising, after reporting the measurement result, receiving a handover command from the CSG cell.

4. The method of claim 3, wherein the measurement result and the expiration of the CSG subscription are transmitted to the CSG cell by being included in one message.

5. The method of claim 1, wherein the CSG cell is excluded from selectable cells when performing cell reselection.

6. The method of claim 1, further comprising:
starting a temporary timer when the NAS layer of the mobile terminal announces the expiration of the CSG subscription to the AS layer of the mobile terminal; and
notifying the connection release by the NAS layer of the mobile terminal to the AS layer of the mobile terminal at an expiration of the temporary timer.

7. The method of claim 6, further comprising upon receiving the RRC connection release message from the CSG cell while the temporary timer is running, stopping the temporary timer and performing cell reselection.

8. The method of claim 6, further comprising upon receiving a handover command from the CSG cell while the temporary timer is running, stopping the temporary timer and performing a handover.

9. A user equipment for processing changes in a closed subscriber group (CSG) subscription in a wireless communication system, the user equipment comprising:
a radio frequency (RF) unit for transmitting and receiving a radio signal; and
a processor coupled to the RF unit for implementing a radio interface protocol, wherein the processor is configured for:
receiving, by a non-access stratum (NAS) layer of the mobile terminal, an NAS message from a network,
wherein the NAS message indicates an expiration of the CSG subscription for a CSG cell,
wherein the NAS message is received during a CSG service provided from the CSG cell;
announcing by the NAS layer of the mobile terminal, the expiration of the CSG subscription to an access stratum (AS) layer of the mobile terminal;
transmitting by the AS layer of the mobile terminal, the expiration of the CSG subscription to the CSG cell;
receiving, by the NAS layer of the mobile terminal, a radio resource control (RRC) connection release message from the CSG cell after the transmitting the expiration of the CSG subscription, wherein the RRC connection release message includes a release cause field indicating the expiration of the CSG subscription; and
performing, by the AS layer of the mobile terminal, a cell reselection after receiving the RRC connection release message.

* * * * *